US008677343B2

(12) United States Patent  (10) Patent No.: US 8,677,343 B2
Averbuch et al.  (45) Date of Patent: Mar. 18, 2014

(54) CENTRALLY COORDINATED FIRMWARE UPGRADE MODEL ACROSS NETWORK FOR MINIMIZING UPTIME LOSS AND FIRMWARE COMPATIBILITY

(75) Inventors: Aaron H. Averbuch, Seattle, WA (US); Siddhartha Dattagupta, Irvine, CA (US); Mark Chekhanovskiy, San Jose, CA (US); David Davis, San Jose, CA (US); Edward W. James, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 13/235,035

(22) Filed: Sep. 16, 2011

(65) Prior Publication Data
US 2013/0074061 A1 Mar. 21, 2013

(51) Int. Cl.
G06F 9/44 (2006.01)
(52) U.S. Cl.
USPC .......................................... 717/171; 717/170
(58) Field of Classification Search
USPC ........................... 717/168–173; 709/223, 224
See application file for complete search history.

(56) References Cited

U.S. PATENT DOCUMENTS

| | | | |
|---|---|---|---|
| 6,516,346 B1 * | 2/2003 | Asco et al. | 709/221 |
| 7,318,151 B1 * | 1/2008 | Harris | 713/2 |
| 7,555,657 B2 * | 6/2009 | Nasu | 713/191 |
| 7,707,573 B1 * | 4/2010 | Marmaros et al. | 717/178 |
| 7,881,745 B1 * | 2/2011 | Rao et al. | 455/551 |
| 8,392,960 B2 * | 3/2013 | Ikeda et al. | 725/139 |
| 8,527,981 B2 * | 9/2013 | Oikawa et al. | 717/173 |
| 2003/0217357 A1 * | 11/2003 | Parry | 717/168 |
| 2007/0169073 A1 * | 7/2007 | O'Neill et al. | 717/168 |
| 2008/0028395 A1 * | 1/2008 | Motta et al. | 717/177 |
| 2010/0169876 A1 * | 7/2010 | Mann | 717/170 |
| 2011/0072423 A1 * | 3/2011 | Fukata | 717/172 |
| 2013/0036412 A1 * | 2/2013 | Birtwhistle et al. | 717/171 |
| 2013/0036415 A1 * | 2/2013 | Birtwhistle | 717/173 |

* cited by examiner

*Primary Examiner* — Phillip H Nguyen
(74) *Attorney, Agent, or Firm* — Patterson & Sheridan, LLP

(57) ABSTRACT

Techniques are presented for managing firmware updates for a plurality of devices within a wireless network. Embodiments monitor network usage of the plurality of devices to collect historical usage data. An optimal window of time for updating the firmware of the plurality of devices is then determined, based on the collected historical device usage data. Embodiments flag at least one of the plurality of devices for a firmware update, based on a current firmware version of the device and a corresponding available firmware version for the device. In one embodiment, dependencies for each of the plurality of devices are considered in flagging the devices for the firmware update. The firmware of the flagged devices is updated during the determined optimal window of time.

24 Claims, 10 Drawing Sheets

CENTRALLY COORDINATED FIRMWARE UPGRADE MODEL ACROSS NETWORK FOR MINIMIZING UPTIME LOSS AND FIRMWARE COMPATIBILITY

TECHNICAL FIELD

Embodiments presented in this disclosure generally relate to firmware updates and more specifically relate to managing firmware updates for a plurality of devices within a wireless network.

BACKGROUND

Wireless networks are telecommunications networks that use radio waves to carry information from one node in the network to one or more receiving nodes in the network. Wired communication can also be used in portions of a wireless network, such as between cells or access points. Many wireless protocols have been developed, including WiFi, an implementation of various IEEE 802.11 protocols; Worldwide Interoperability for Microwave Access ("WiMAX"), an implementation of IEEE 802.16; and High Performance Radio Metropolitan Area Network ("HiperMAN"), which is based on an ETSI alternative to IEEE 802.16.

Wireless communication networks are frequently used in connection with a variety of different technologies, including, for example, satellite communications systems, portable digital assistants ("PDAs"), laptop computers, and mobile devices (e.g., cellular telephones). One benefit that wireless networks provide to users of such technologies is the ability to connect to a network (e.g., the Internet) as long as the user is within range of such wireless communication technologies.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1A:
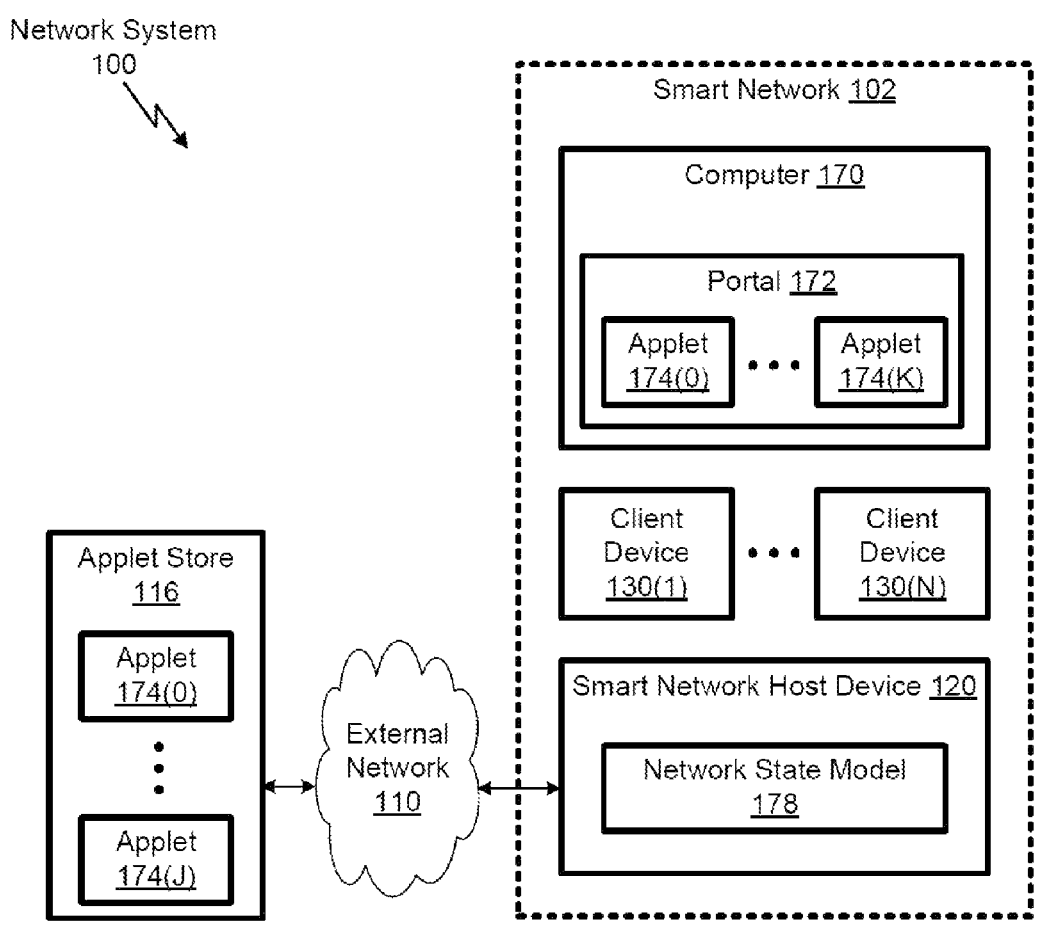
FIG. 1A is an exemplary illustration of an overarching network system configured to implement one or more embodiments presented in this disclosure.

Embodiments provide a method for managing firmware updates for a plurality of devices within a wireless network. The method includes monitoring network usage of the plurality of devices to collect historical device usage data. The method further includes, determining a window of time for updating firmware of the plurality of devices based on the collected historical device usage data. Additionally, the method includes flagging at least one of the plurality of devices for updating, based on, for each of the at least one devices, a current firmware version for the device and a corresponding available firmware version for the device. The method also includes updating the firmware of the at least one flagged device during the determined window of time.

Additional embodiments include a system having a processor and a memory storing a program configured to perform the aforementioned method, and software embodied in a computer readable medium storing a program configured to perform the aforementioned method.

DESCRIPTION OF EXAMPLE EMBODIMENTS

Often times, a wireless network is used to connect multiple different devices. For example, a particular wireless network could include a cellular telephone, a laptop computer, a digital video recorder ("DVR") and a WiFi-equipped television set. Each of these devices, in turn, may run firmware and/or software in order to manage the operations of the respective device. Although firmware updates for the devices could be manually managed by users of the wireless network, such a solution is less than optimal, as often times the users may forget to update the firmware for the devices. Furthermore, less sophisticated users may be unable to update the firmware on the devices or may be afraid to update the firmware for fear of making a mistake during the process. However, as such firmware updates may include security fixes and/or new features for the devices, it is often important for the firmware on such devices to be up-to-date.

Additionally, each of the devices may be configured to manage its own firmware and/or software updates. However, these self-managed update operations may interfere with the other devices on the wireless network. For example, the WiFi-equipped television set could automatically begin updating its firmware, but such an operation could consume a substantial amount of bandwidth on the wireless network and interfere with the operations of the other devices. Additionally, a device managing its own firmware updates may schedule an update at an inopportune time for users of the wireless network. As an example, the WiFi-equipped television set could schedule its firmware update at a time when the television is most frequently watched by users. In such an example, the users may be inconvenienced, as they may be unable to watch the television during the firmware update.

Furthermore, in some cases, a firmware upgrade for a first device may be dependent on the state of the firmware on a second device. For example, a firmware update may be available for the WiFi-equipped television that allows the television to stream particular video content from the DVR over the wireless network. However, the firmware update for the television could depend on the DVR having a minimum version of the DVR firmware. If the DVR has not yet been updated to at least the minimum version of its firmware, it may be problematic for the television to automatically update its own firmware, as the dependency for the DVR firmware has not yet been satisfied.

As such, embodiments provide techniques for managing firmware updates amongst devices in a wireless network. A firmware management component on a network device within the wireless network (e.g., a wireless access point ("WAP")) could monitor network usage of the devices to collect historical device usage data. For instance, the historical device usage data could track an amount of bandwidth used by each of the devices over a period of time. As another example, the historical device usage data could track the number of network messages received from each of the devices over the period of time. The firmware management component could then determine an optimal window of time for updating the firmware of the plurality of devices, based on the collected historical device usage data. For instance, the firmware management component could analyze the historical device usage data to determine a period of time where the devices are generating little or no network traffic on the wireless network, as such a lack of network traffic may indicate that the devices are idle during this period of time.

Additionally, the firmware management component could flag at least one of the devices for a firmware update, based on a current firmware version for the device and a corresponding available firmware version for the device. For example, if the firmware management component determines that there is a more recent version of firmware available for a first device, the firmware management component could flag the first device for a firmware update. The firmware management component could determine that a firmware update is available for a device by querying a centralized server configured to maintain a data store (e.g., a database) containing information on currently available firmware updates. In one embodiment, the firmware management component is configured to transmit a request to the devices to determine whether a firmware update is available for each of the respective devices. In such an embodiment, the devices could each query a remote server (e.g., the centralized server, a server specific to the device or a class of devices, etc.) to determine whether a firmware update is available and could report this information to the firmware management component in response to the request. The firmware management component then updates the firmware on the flagged at least one device during the determined optimal window of time. Advantageously, doing so ensures that firmware updates will be applied to the devices at an optimal time, so as to minimize any inconvenience to users of the devices.

In one embodiment, the firmware management component is configured to identify one or more dependencies between firmware versions across two or more devices within the wireless network and to account for these dependencies when flagging devices for updates. For instance, consider the example given above of a firmware update that allows a WiFi-equipped television to stream particular video content from a DVR over the wireless network, where the firmware update for the television depends on the DVR having a minimum version of the DVR firmware. In such an example, the firmware management component, upon determining that the firmware update for the WiFi-equipped television is available but depends on a minimum version of the DVR firmware, could determine whether the DVR is currently running at least the minimum version of the DVR firmware. If so, the firmware management component could flag the WiFi-equipped television for updating. The firmware management component could also determine whether the DVR could be updated to at least the minimum version of the DVR firmware. If so, the firmware management component could flag both the television and the DVR for updating. Advantageously, doing so ensures that the firmware updates for the devices will be scheduled not only at an optimal time while further ensuring that any dependencies for the firmware updates are satisfied.

FIG. 1A illustrates a network system 100, configured to implement one or more embodiments presented in this disclosure. The network system 100 comprises a smart network 102, an external network 110 and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator ("URL") associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
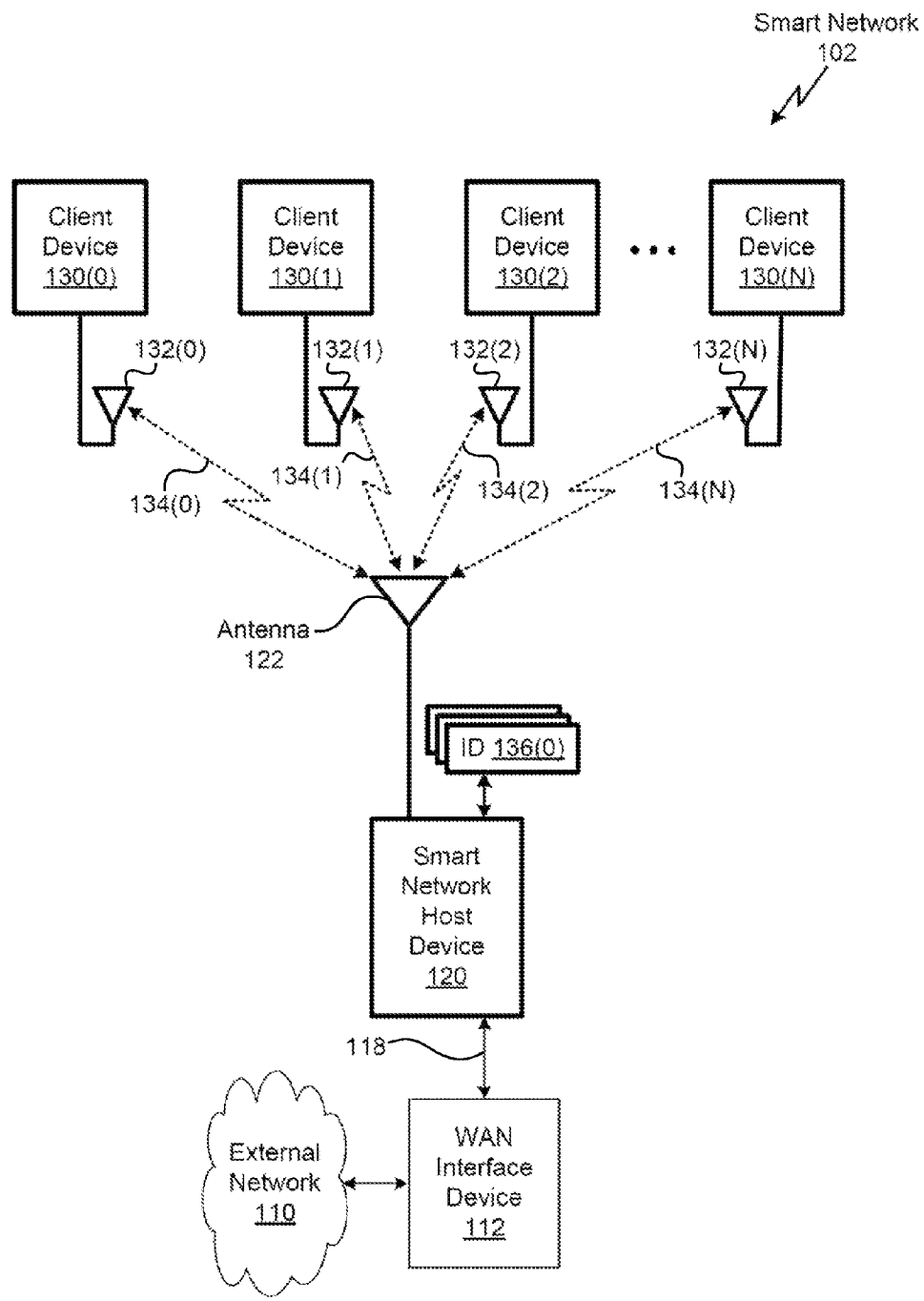
FIG. 1B illustrates the smart home network of FIG. 1A, according to one embodiment presented in this disclosure.

FIG. 1B illustrates the smart network 102, according to one embodiment presented in this disclosure. As shown, the smart network 102 comprises a smart network host device 120, one or more client devices 130, and a wide area network ("WAN") interface device 112, coupled to the external network 110 of FIG. 1A. The WAN interface device 112 may implement a cable modem, digital subscriber line ("DSL") modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers ("IEEE") standard 802.11, which defines a system for wireless local area networking. The antenna 122 is configured establish wireless client links 134 to antennas 132 coupled to corresponding client devices 130. The smart network host device 120 implements Ethernet layer 2 switching for wireless data packets forwarded among client devices 130 as well as internet protocol ("IP") layer 3 routing between an IP domain associated with the smart network 102 and the external network 110. In this configuration, the smart network host device 120 provides related services and protocols, such as dynamic host configuration protocol ("DHCP"), network address translation ("NAT"), and the like.

The smart network host device 120 acts as a central authentication authority for the smart network 102 and implements authentication services for devices registering with the smart network 102. In one embodiment, authentication is implemented via Identification ("ID") devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification ("RFID") tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of embodiments presented in this disclosure. In alternative embodiments, other forms of ID devices 136 may implement storage of the authentication credentials. For example, a universal serial bus ("USB") storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode ("LED"), or by generating any technically feasible indication.

Figure 1C:
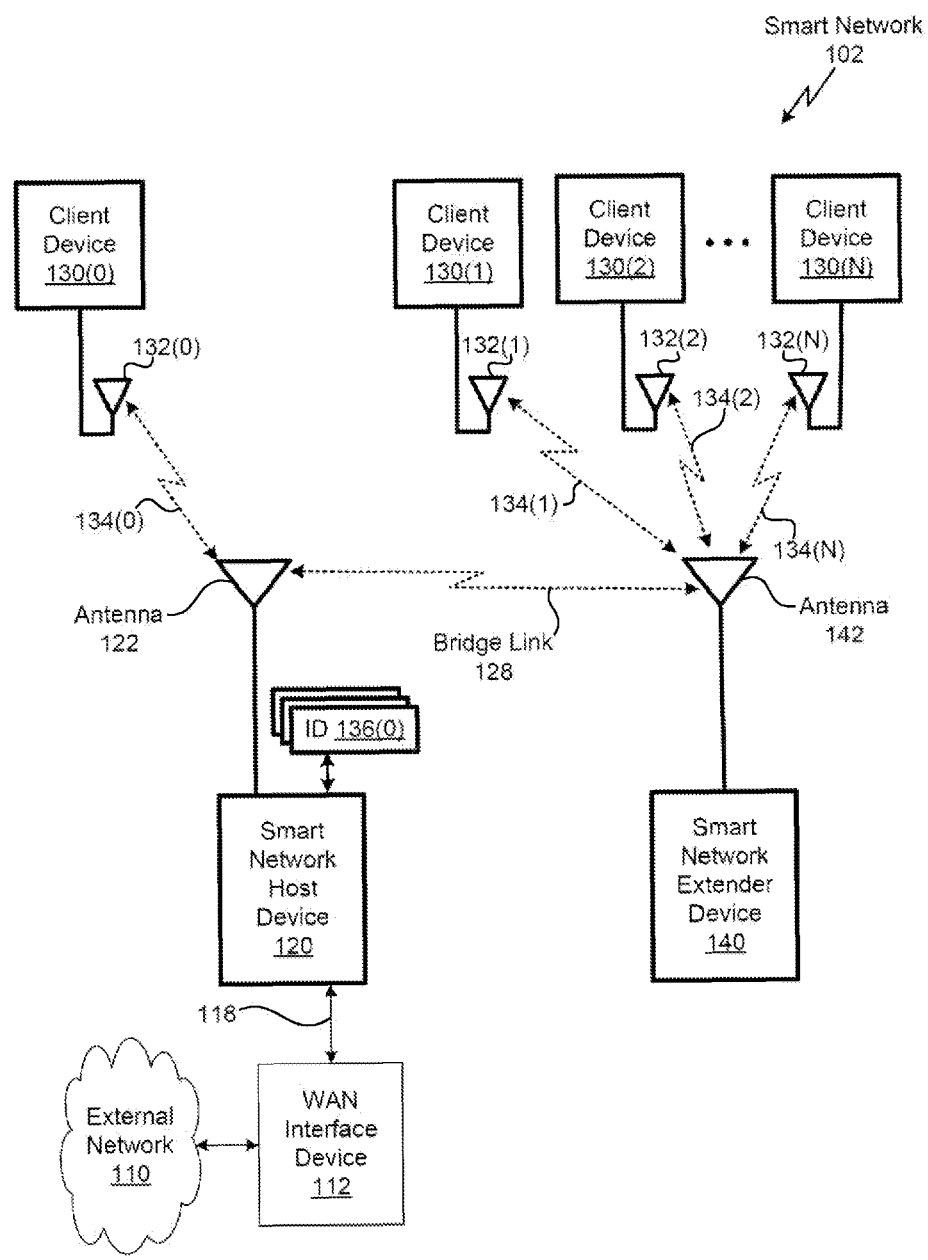
FIG. 1C illustrates the smart home network of FIG. 1A, according to another embodiment presented in this disclosure.

FIG. 1C illustrates the smart network 102, according to another embodiment presented in this disclosure. Here, the smart network 102 comprises a smart network host device 120, a smart network extender device 140, one or more client devices 130, and a wide area network ("WAN") interface device 112, coupled to the external network 110 of FIG. 1A. The WAN interface device 112, smart network host device 120 and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
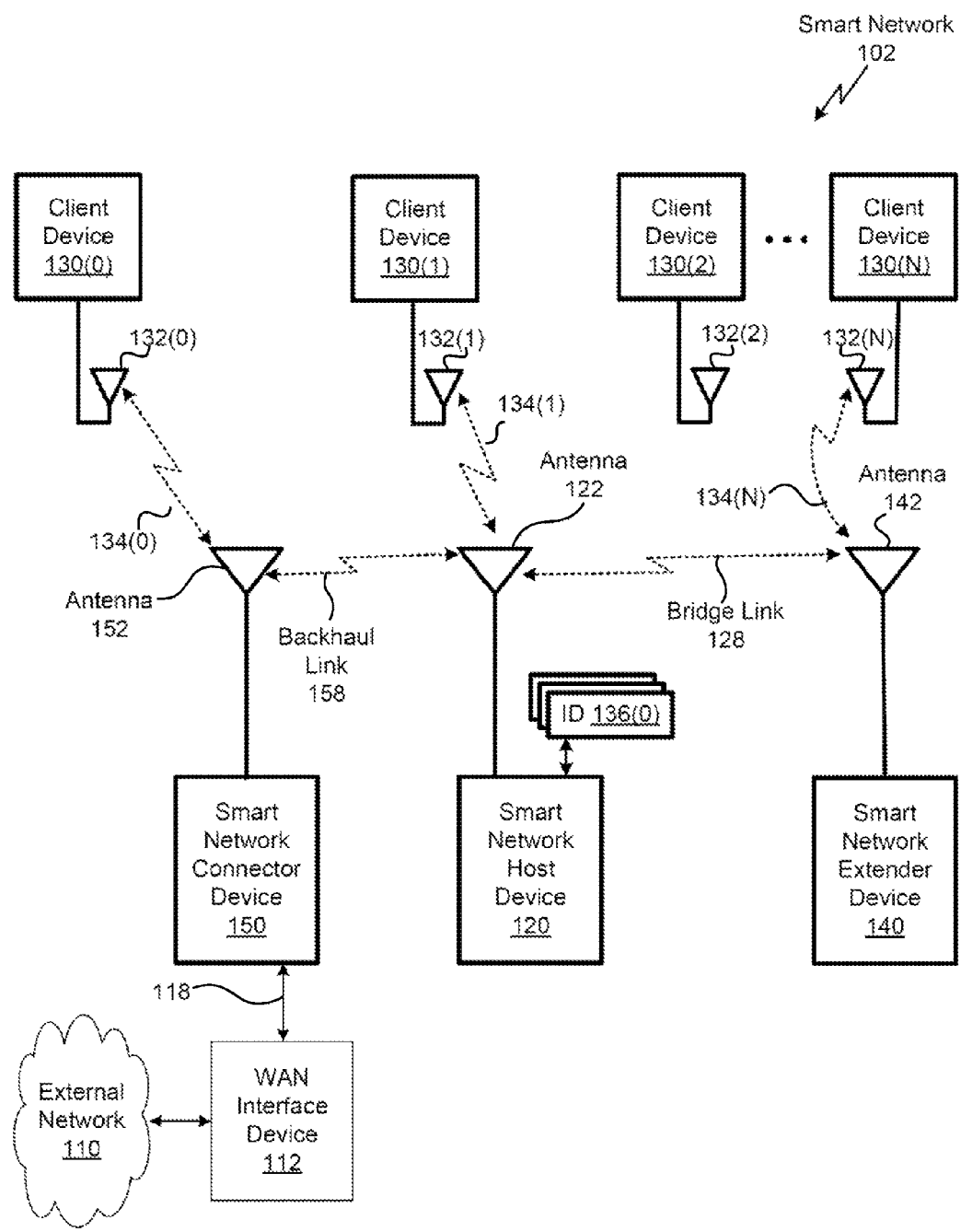
FIG. 1D illustrates the smart home network of FIG. 1A, according to yet another embodiment presented in this disclosure.

FIG. 1D illustrates the smart network 102, according to yet another embodiment presented in this disclosure. Here, the smart network 102 comprises a smart network host device 120, a smart network extender device 140, one or more client devices 130, a smart network connector device 150, and a wide area network ("WAN") interface device 112, coupled to the external network 110 of FIG. 1A. The WAN interface device 112, smart network extender device 140 and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128 and backhaul link 158. This network data traffic is also forwarded by smart network extender device 140, smart network host device 120 and smart network connector device 150. A client device 130 may connect directly to any one of the network extender device 140, smart network host device 120 or smart network connector device 150. As shown, client device 130(0) is connected to smart network connector device 150 via wireless client link 134(0), client device 130(1) is connected to smart network host device 120 via wireless client link 134(1) and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
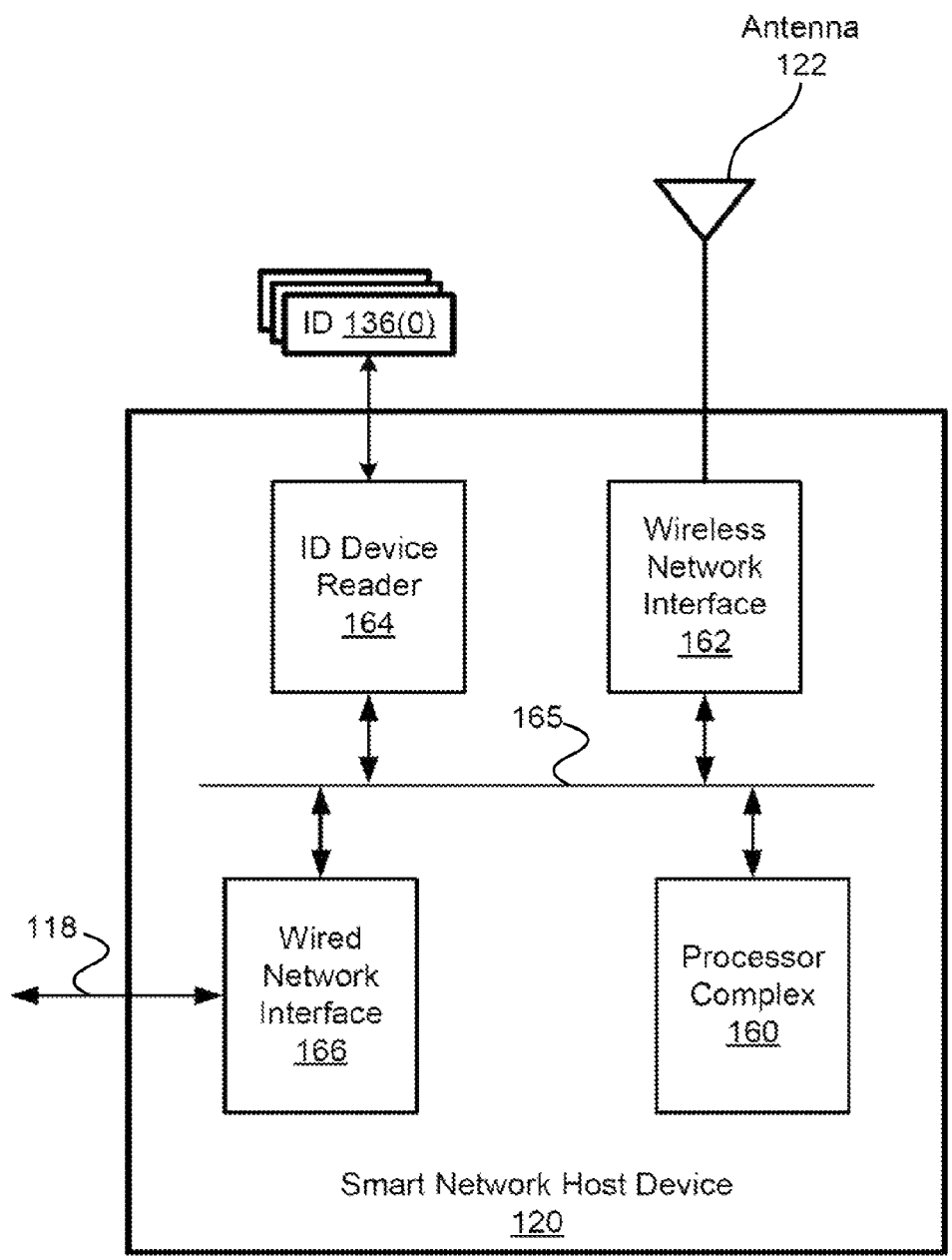
FIG. 1E is a more detailed illustration of the smart network host device of FIG. 1A, according to one embodiment presented in this disclosure.

FIG. 1E is a more detailed illustration of the smart network host device 120, according to one embodiment presented in this disclosure. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory ("RAM") for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader.

In certain embodiments, the smart network host device 120 comprises one or more integrated circuits that implement respective functions of the smart network host device 120. For example, the processor complex 160, wired network interface 166 and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
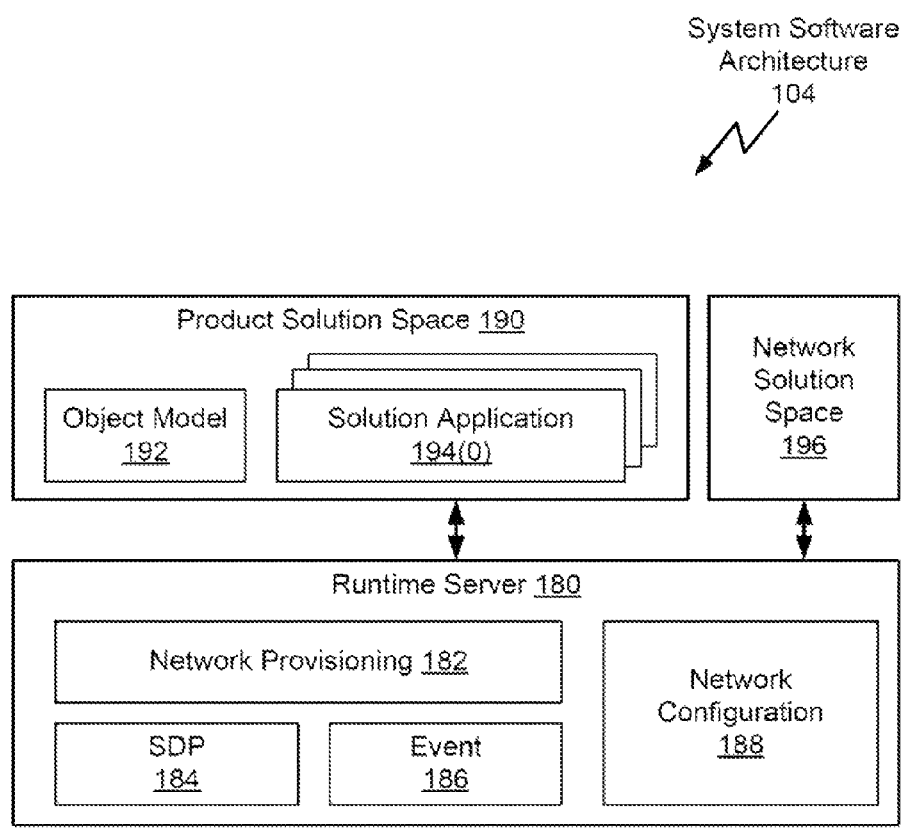
FIG. 1F illustrates a system software architecture for the smart network host device of FIG. 1E, according to one embodiment presented in this disclosure.

FIG. 1F illustrates a system software architecture 104 for the smart network host device 120, according to one embodiment presented in this disclosure. As shown, the software architecture 104 includes several software modules within the smart network host device 120. Programming instructions stored within the processor complex 160 implement a portion of the system software architecture 104 that includes a runtime server 180, a product solution space 190 and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras and display devices. Exemplary services include device and service discovery, event tracking and generation, and state presentation for the different elements. In one embodiment, the object model 192 includes a network interface based on the well-known extensible markup language ("XML"). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning ("SDP") module 184, an event module 186 and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

Figure 2:
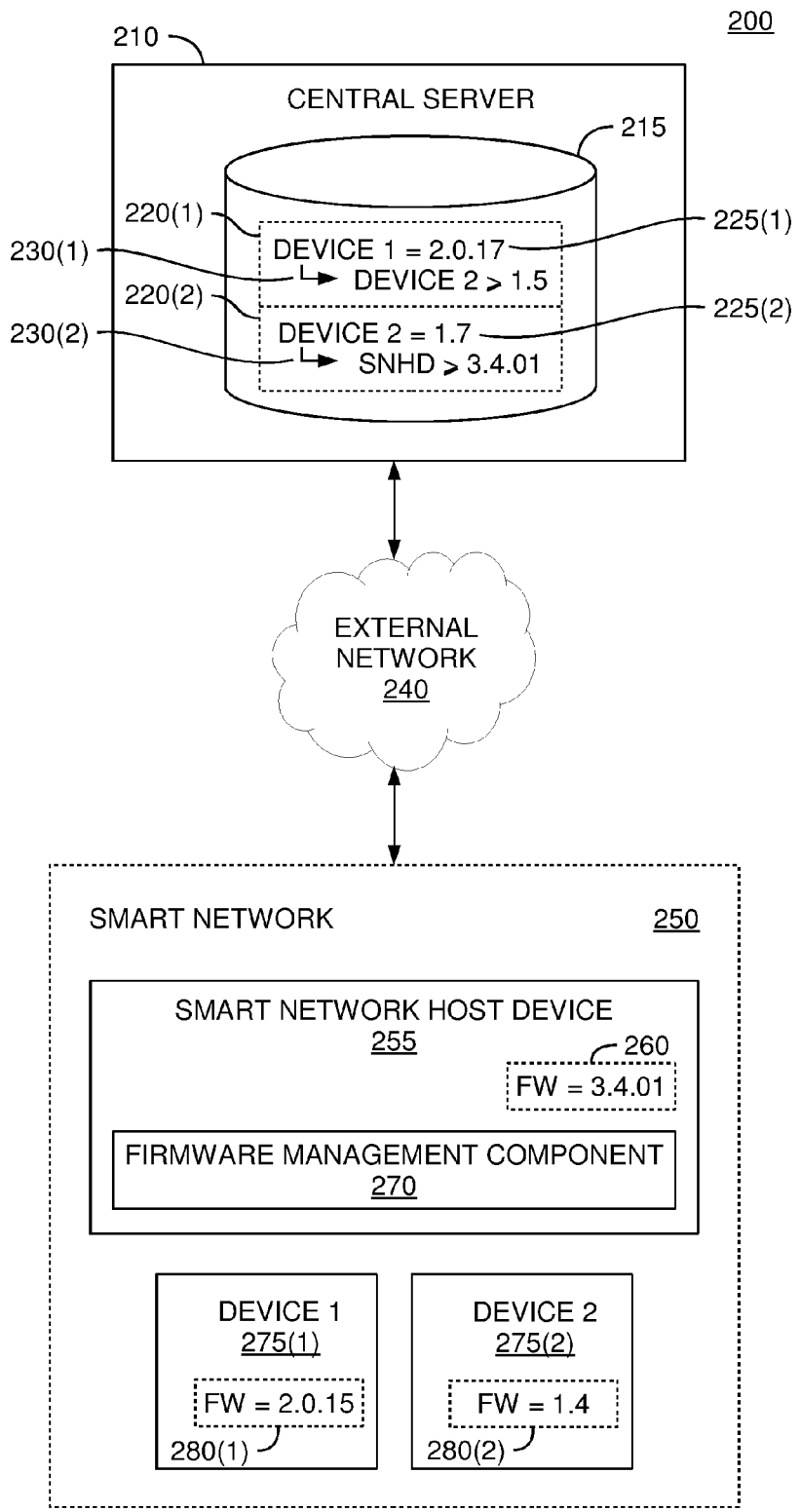
FIG. 2 illustrates a smart home network configured with a firmware management component, according to one embodiment presented in this disclosure.

FIG. 2 illustrates a smart home network configured with a firmware management component, according to one embodiment presented in this disclosure. As shown, the networked system 200 includes a central server 210 and a smart network 250, communicatively connected by an external network 240. The external network 240 may comprise the well-known Internet or any other data network system. The smart network 250 includes a smart network host device ("SNHD") 255 configured to transmit network data packets between the external network 240 and connected devices within the smart network 250, such as device 1 275(1) and device 2 275(2). Generally, any technically feasible wireless or wired physical transport technology may be implemented to transmit the network data packets.

The central server 210 generally represents a remote computer system configured to run a data store 215. The data store 215 contains information 230 on firmware versions and firmware update information for various devices. In one embodiment, the data store 215 is implemented as a database storing firmware versioning information. In the depicted embodiment, the data store 215 contains firmware information 220 for various devices, including most recent firmware version information and dependency information for the devices. The firmware information 220(1) specifies a most recent version 225(1) of the firmware for device 1, which in the depicted example is version "2.0.17." Likewise, the firmware information 220(2) specifies a most recent version 225(2) of the firmware for device 2, which in the depicted example is version "1.7." Additionally, the firmware information 220(1) specifies that version of "2.0.17" of the firmware for device 1 is dependent upon any device 2 within the network having at least version "1.5" of the device 2 firmware. Likewise, the firmware information 220(2) specifies that version "1.7" of the firmware for device 2 is dependent upon any SNHD within the network having at least version "3.4.01" of the SNHD firmware.

In the depicted embodiment, the SNHD 255 is configured with a firmware management component 270 which generally manages firmware upgrades across devices in the smart network 250. For instance, the firmware management component 270 could determine an optimal period of time for updating the firmware of the devices 275 within the smart network 250. The firmware management component 270 could further flag one or more devices 275 for a firmware update and schedule a firmware update for the determined optimal time for the flagged devices. Generally, the firmware management component 270 determines the optimal update time based on periods of inactivity across the devices 275. For instance, the firmware management component 270 could monitor network traffic on the SNHD 255 generated by the devices 275, as a device 275 generating a substantial amount of network traffic could indicate that the device 275 is currently being used. As such, the firmware management component 270 could determine that periods of low network activity from the devices 275 correspond to periods of inactivity for the devices 275. One advantage to the firmware management component 270 as residing within the SNHD 255 is that the firmware management component 270 may more easily monitor network traffic generated by the devices 275 within the smart network 250. More generally, however, the firmware management component 270 may reside on any system or devices within the smart network 250 from which the functionalities described herein may be realized.

In one embodiment, the firmware management component 270 is configured to transmit a status request to the devices 275 in order to determine whether they are currently active or inactive. For example, the devices 275 could implement a common application programming interface ("API") or protocol through which the firmware management component 270 could query the devices for their current status information. For instance, the firmware management component 270 could be configured to periodically poll each of the devices with such a status request in order to determine trends of activity and inactivity for the devices over time. Such an embodiment may be advantageous for devices that do not always generate network traffic when they are active. For example, a WiFi-equipped television may generate substantial network traffic when streaming Internet video, but may generate little or no network traffic when playing a Blu-ray disc. However, by querying the status of the television, the firmware management component 270 may determine whether a user is actively using the television, regardless of the amount of network activity generated by the television.

Additionally, the firmware management component 270 may determine whether a firmware upgrade is available for the devices 275 and, if so, flag the devices 275 for an update during the determined optimal period of time. For instance, the firmware management component 270 could determine the current firmware versions for the devices 275 by querying each of the devices using the commonly-implemented API or protocol. Thus, in the depicted embodiment, the firmware management component 270 would determine that the SNHD 255 is currently running firmware 260 with version "3.4.01," the device 1 275(1) is currently running firmware 280(1) with version "2.0.15" and the device 2 275(2) is currently running firmware 280(2) with version "1.4."

In order to determine whether firmware updates are available for the devices 275, the firmware management component 270 could query the data store 215 on the central server 210 to retrieve the firmware information 220. Upon retrieving the firmware information 220, the firmware management component 270 could compare the most recent firmware version information 225 with the current version information 280 for the corresponding devices 275, in order to determine which devices should be updated. For example, the firmware management component 270 could determine whether an update is available for device 1 275(1) by comparing the current version of firmware 280(1) installed on the device with the most recently released version of the firmware 225(1) for the device. Thus, in the current example, the firmware management component 270 determines that the device 1 275(1) is currently running firmware version "2.0.15," but the more recent firmware version of "2.0.17" is available. As such, the firmware management component 270 could flag device 1 275(1) for a firmware update.

In one embodiment, upon determining that a more recent version of the firmware is available for a device 275, the firmware management component 270 may further determine whether the more recent firmware version has any dependencies. Additionally, the firmware management component 270 could determine whether any such dependencies are currently satisfied within the smart network 250, and if not, whether such dependencies could be satisfied through a firmware update of a second device. As an example, the more recent version of the firmware 225(1) is shown as dependent upon any device 2 within the network having at least version 1.5 of its firmware. Thus, upon determining that the smart network 250 includes the device 2 275(2), the firmware management component 270 could determine whether the device 2 275(2) currently has at least version 1.5 of its firmware installed (i.e., whether the dependency is currently satisfied). However, in the depicted example, the firmware management component 270 would determine that the device 2 275(2) is currently running firmware version "1.4" 280(2). Thus, the firmware management component 270 would determine that the dependency for updating device 1 275(1) is not currently satisfied.

The firmware management component 270 may then determine whether the dependency can be satisfied by updating the firmware of device 2 275(2). Thus, the firmware management component 270 could compare the version of the firmware 280(2) with the retrieved version 225(2) of the most recent firmware for the device 275(2) and determine that the device 2 275(2) could potentially be updated to firmware version "1.7," which would satisfy the dependency of device 2 having at least firmware version "1.5." The firmware management component 270 could then process the retrieved firmware information 220(2) to determine whether there are any dependencies for updating the firmware of device 2 275 (2). In the depicted example, the firmware management component 270 would determine that the firmware update for device 2 has the dependency 230(2) of SNHD having at least firmware version "3.4.01" of its firmware. Upon identifying the version of the current firmware 260 on the SNHD 255, the firmware management component 270 would determine that the dependency is satisfied, as the SNHD 255 is currently running firmware version 260 of "3.4.01." As such, the firmware management component 270 could determine that device 2 275(2) can be successfully updated to firmware version "1.7," which in turn satisfies the dependency for device 1 275(1).

As such, the firmware management component 270 may schedule an update of the firmware of both device 1 275(1) and device 2 275(2) during the determined optimal window of time. In one embodiment, the firmware management component 270 may schedule the firmware update of device 2 275 (2) prior to the firmware update of device 1 275(1), so as to ensure all the dependencies for the firmware update for device 1 275(1) are satisfied prior to the update of the device 1 275(1) firmware. Advantageously, by doing so, the firmware management component 270 ensures that the firmware on devices within the smart network 250 is kept up-to-date. Additionally, by scheduling such firmware updates at the determined optimal update time when the devices have historically been inactive, the firmware management component 270 helps to minimize any interruption to users of the devices. As yet another advantage, the firmware management component 270 helps to ensure that the firmware updates are successful by identifying any dependencies for the updates and ensuring that these dependencies are satisfied before the updates take place.

As discussed above, the firmware management component 270 may determine whether a firmware update is available for a particular device and, if so, may flag the device for a firmware update at a determined optimal update time. Generally, the firmware management component 270 may be configured to periodically check for firmware updates for the devices at predefined intervals. Examples of such intervals include, without limitation, hourly intervals, daily intervals and weekly intervals.

Additionally, the firmware management component 270 could be configured to determine the interval at which to check for firmware updates for a particular device based on a type of the device. For instance, the firmware management component 270 could check every day for firmware updates for a first type of device, but could check only once a week for firmware updates for a second type of device. Such an embodiment may be advantageous when different types of devices within the network have different levels of security concerns. For instance, the firmware management component 270 could check more frequently for firmware updates for the SNHD 255, as such updates may include security fixes that may prevent malicious attacks from external sources via the external network 240. However, the firmware management component 270 could be configured to check less frequently for firmware updates for a WiFi-equipped television device 275 within the smart network 250, as such firmware updates may often include minor bug fixes and cosmetic changes. Advantageously, doing so may minimize the resources used by the firmware management component 270, while ensuring that high priority firmware updates are quickly detected.

Figure 3:
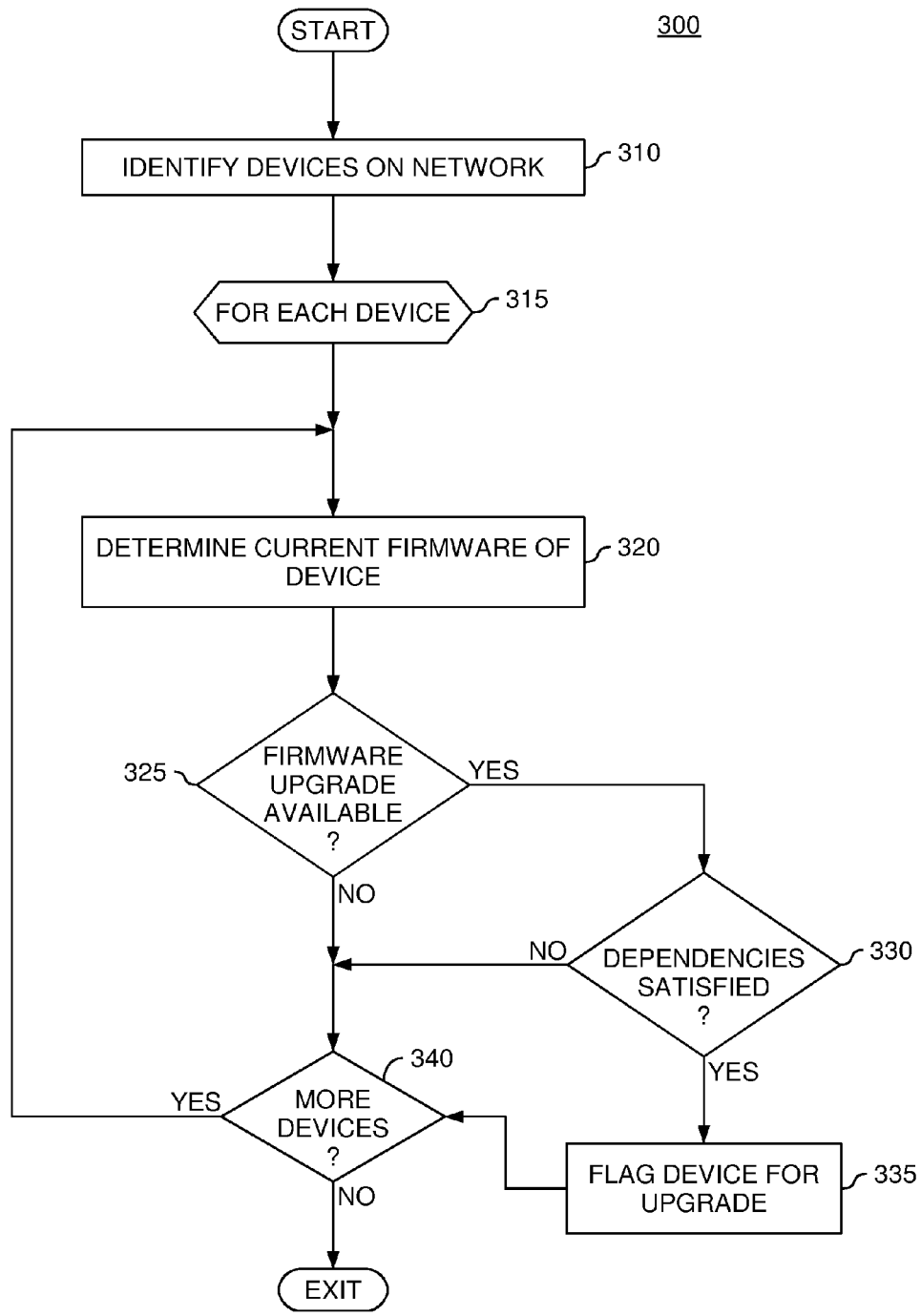
FIG. 3 is a flow diagram illustrating a method for flagging devices for firmware upgrades, according to one embodiment presented in this disclosure.

FIG. 3 is a flow diagram illustrating a method for flagging devices for firmware upgrades, according to one embodiment presented in this disclosure. As shown, the method 300 begins at step 310, where the firmware management component 270 identifies a plurality of devices on the wireless network. For example, in an embodiment where the firmware management component 270 resides on a WAP (e.g., the smart network host device 255), the firmware management component 270 may identify the plurality of devices based on the devices connected to the WAP. Generally, the firmware management component 270 may assign a unique identifier to each of the identified devices so that the devices are individually distinguishable. As an example, the firmware management component 270 could maintain a list of identified devices, where each device is identified by its media access control ("MAC") address. As another example, the firmware management component 270 could generate a random identifier for each of the devices, while ensuring that the generated identifier has not already been assigned to a different device. Of course, these examples are for illustrative purposes only and are without limitation, and more generally, the firmware management component 270 may use any technique suitable for assigning identifiers to the devices on the wireless network.

Additionally, the firmware management component 270 could maintain a list of the devices, based on the devices that have connected to the wireless network over a period of time. Such an embodiment may be preferable, for instance, in a wireless network where devices periodically enter and exit the wireless network. As an example, a user may frequently carry a WiFi-equipped cellular telephone with him. Thus, the telephone may connect to the wireless network when the user is within the range of the wireless network and disconnect from the wireless network when the user exits the range of the wireless network. In such an embodiment, the firmware management component 270 may further store data describing the times each of the devices have historically connected to the wireless network. Such information could then be used by the firmware management component 270 to select an optimal time for updating the firmware of the devices. For instance, the firmware management component 270 could select a period of time where not only have the devices historically been idle, but also where the majority of the devices have historically been connected to the wireless network.

The method 300 then enters a loop at step 315, where for each device, the firmware management component 270 determines a current firmware version for the device (step 320). For instance, as discussed above, each of the devices could be configured with a common API or protocol for communicating with the firmware management component 270. In such an embodiment, the firmware management component 270 could transmit a request to each of the devices requesting the current firmware version for the device and could receive a second request specifying the respective current firmware version from each of the devices.

Upon determining the current firmware version for the device connected to the wireless network, the firmware management component 270 determines whether a firmware update is available for the device (step 325). In one embodiment, the firmware management component 270 queries a remote data store for a most recent version of the firmware for the device in order to determine whether a firmware update is available for the device. For example, the firmware management component 270 could query a database on a centralized server that stores firmware version information for a plurality of devices that implement the common API or protocol for communicating with the firmware management component 270. Such a database could be maintained by, for example, the manufacturers of the various devices as new firmware versions for the devices are created.

In one embodiment, the firmware management component 270 transmits a request to the device to determine the most recent version of the firmware for the device. In such an embodiment, the device could be configured to query a remote data store (e.g., a database maintained by the manufacturer of the device) to determine the most recent firmware version for the device and could transmit the most recent version information to the firmware management component 270. Such an embodiment may be preferred, for instance, when the manufacturer of the device wishes to retain more control over the remote data store.

Upon retrieving the most recent firmware version for the device, the firmware management component 270 could determine whether the firmware update is available for the device by comparing the version of the firmware currently installed on the device with the version of the most recently released firmware. If the firmware management component 270 determines a firmware update is available for the device, the firmware management component 270 then determines whether any dependencies for the most recent version of the firmware are satisfied (step 330). For instance, a particular firmware update for a WiFi-equipped television could require that the WAP (e.g., the smart network host device 255) for the wireless network run at least version 2.0 of the WAP firmware. In such an example, the firmware management component 270 could determine what version of firmware the WAP is currently running (e.g., by querying the WAP) and could determine whether the current version is at least version 2.0 of the WAP firmware. For example, if the firmware management component 270 determines that the WAP is currently running version 2.1 of the WAP firmware, the firmware management component 270 could determine the dependency for updating the television is satisfied.

If the firmware management component 270 determines that all dependencies for the firmware update are satisfied, the firmware management component 270 flags the device for a firmware update (step 335). As an example, the firmware management component 270 could maintain a list of devices to be updated, and upon determining that all the dependencies are satisfied for updating a particular device, the firmware management component 270 could add the particular device to the list of devices to be updated. In one embodiment, upon determining that the dependencies for the firmware upgrade of a first device are not currently satisfied, the firmware management component 270 may further determine whether the dependencies can be satisfied by updating the other devices upon which the first device depends. For instance, continuing the above example, if the firmware management component 270 determines that the WAP is currently running version 1.7 of the WAP firmware, the firmware management component 270 may then determine whether a firmware update is available for the WAP that would satisfy the version 2.0 or higher requirement. As an example, the firmware management component 270 could query a remote server to determine whether firmware is available for the WAP that would satisfy the requirement. As another example, the firmware management component 270 could transmit a request to the WAP to determine the most recent version of firmware available for the WAP. Responsive to such a request, the WAP could be configured to query a remote server in order to determine the most recent version of the firmware and could report this information back to the firmware management component 270.

Upon determining that the dependency can be satisfied, the firmware management component 270 may flag both the first device and the other device(s) for firmware updates. Continuing the example, the firmware management component 270 could query a remote server and determine that firmware version 2.1 is available for the WAP. Upon determining that a version of the WAP firmware that satisfies the dependency requirement is available, the firmware management component 270 could flag the television for a firmware update and also flag the WAP for an update to firmware version 2.1. In one embodiment, the firmware management component 270 may further specify an order for the firmware updates to ensure that any dependencies are in place before the first device firmware is updated. In the above example, the firmware management component 270 could further designate that the WAP firmware should be updated prior to the television set firmware, to ensure that the dependencies are satisfied for the television set firmware update before the television set firmware is updated.

Once the device is flagged for a firmware upgrade, or if the firmware management component 270 determines that the dependencies for the device are not (or cannot) be satisfied (at step 330), or if no firmware updates are available for the device (at step 325), the firmware management component 270 then determines if there are more devices within the wireless network to analyze for potential firmware updates (step 340). If there are more devices to consider for firmware updates, the method 300 returns to step 320, where the firmware management component 270 determines the current firmware of the next device. If instead the firmware management component 270 determines there are no more devices to consider, the method 300 ends.

Figure 4:
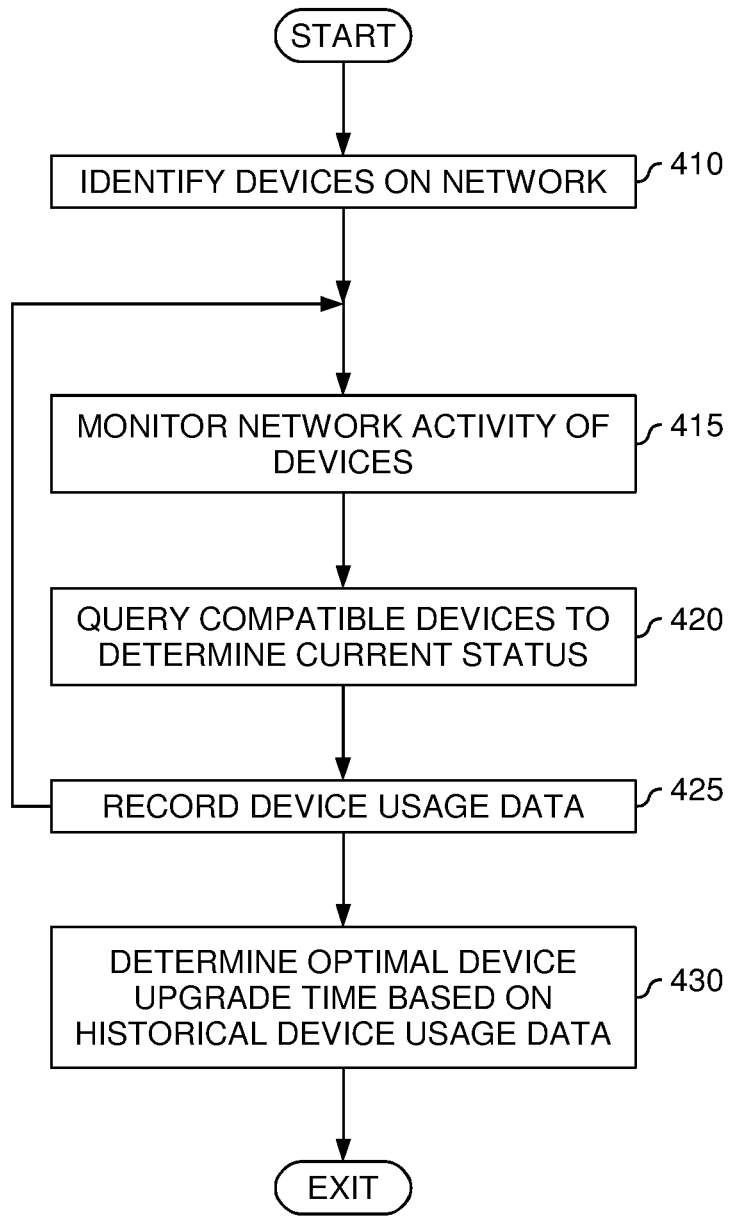
FIG. 4 is a flow diagram illustrating a method for determining a period of time for updating the firmware of one or more devices, according to one embodiment presented in this disclosure.

As discussed above, the firmware management component 270 may not only determine which devices should have their firmware updated, but the firmware management component 270 may further determine an optimal time for updating the firmware. One example of such a determination of an optimal upgrade time is shown in FIG. 4, which shows a flow diagram illustrating a method for determining a period of time for updating the firmware of one or more devices, according to one embodiment presented in this disclosure. As shown, the method 400 begins at step 410, where the firmware management component 270 identifies one or more devices on the wireless network. As discussed above, the firmware management component 270 may associate a unique identifier with each of the identified devices (e.g., a MAC address). Additionally, the firmware management component 270 may maintain the list of devices on the wireless network over a period of time. For instance, the firmware management component 270 could maintain a list of devices that have previously connected to the wireless network and could further store information on the times that these devices have historically connected to the wireless network.

Additionally, in the depicted embodiment, the firmware management component 270 monitors network activity of each of the devices on the wireless network (step 415). For instance, the firmware management component 270 could monitor an amount of bandwidth being used by each of the devices. The firmware management component 270 could maintain such usage information over a period of time in order to determine periods of relative inactivity for each of the devices. As an example, the firmware management component 270 could monitor the network activity of a WiFi-equipped telephone and determine that the telephone uses a relatively small amount of bandwidth during the hours of 1:00 am and 7:00 am. The firmware management component 270 could additionally maintain data characterizing times that each of the devices has historically been connected to the wireless network. Continuing the example, the firmware management component 270 could further determine, based on the monitored network activity of the WiFi-equipped telephone, that the telephone has historically been disconnected from the wireless network between the hours of 8:00 am and 6:00 pm (e.g., a wireless home network where the user is out of the home between the hours of 8:00 am and 6:00 pm).

In the depicted embodiment, the firmware management component 270 queries compatible devices within the wireless network to determine status information for each of the devices (step 420). The firmware management component 270 could be configured to periodically poll compatible devices within the wireless network. For instance, particular devices within the wireless network may implement a common API or protocol where the devices are configured to transmit status information to the firmware management component 270 in response to receiving a status information request from the firmware management component 270. For example, the firmware management component 270 could transmit a status request to a WiFi-equipped television within the wireless network and the television could be configured to transmit status information to the firmware management component 270 in response to receiving the status request. Such status information could specify, for instance, whether the television is currently powered on or whether the television is in a power save mode.

The firmware management component 270 could use such status information to identify periods of inactivity for the devices. As an example, if the firmware management component 270 determines that the television has historically been in power save mode between the hours of 1:00 am and 5:00 pm, the firmware management component 270 could determine that television is frequently inactive between these hours and conversely should not have its firmware upgraded between the hours of 5:01 pm and 12:59 am the following day. Such status inquiries may be preferable for devices that do not necessarily use any network bandwidth during normal operation. For example, a WiFi-equipped television may use a substantial amount of bandwidth when streaming video over a network (e.g., the Internet), but may not use any bandwidth on the wireless network when playing a Blu-ray disc. Nonetheless, a user would likely be frustrated if the firmware on the television was updated during either activity. As such, by querying the device to determine status information of the device, the firmware management component 270 can more accurately identify an optimal period of time for updating the firmware of the device.

The firmware management component 270 then updates historical device usage data for each of the devices based on the monitored network activity and/or status information for the devices (step 425). As discussed above, the firmware management component 270 may continue such monitoring operations over a period of time in order to collect the historical device usage data. As such, the method 400 is shown as returning to the step 415, where the firmware management component 270 monitors the network activity of the devices on the wireless network. For instance, the firmware management component 270 may be configured to periodically poll for network activity for and device status information at predefined intervals.

At some point, the firmware management component 270 determines an optimal firmware update time for the devices based on the historical device usage data that the firmware management component 270 has collected (step 430). In one embodiment, the firmware management component 270 determines a single period of time for updating the firmware of all the devices on the wireless network. For instance, in making such a determination, the firmware management component 270 could consider historic periods of inactivity for the devices and select a period of time in which the devices are inactive, in order to help ensure that the firmware update does not interfere with the users' use of the devices. Additionally, the firmware management component 270 could consider when the devices have historically been connected to the wireless network. That is, certain devices may frequently enter and exit the wireless network (e.g., a cellular telephone that a user brings with him when leaving the home). As such, the firmware management component 270 may select a time in which all the devices have historically been within the wireless network, so as to ensure that the firmware can be updated on all of the flagged devices. Once the firmware management component 270 determines the optimal device upgrade time, the method 400 ends.

In some cases, the firmware management component 270 may be unable to determine a single period of time which is acceptable for all of the devices. For example, a first device could have historically been active from 12:00 am until 12:00 pm, while a second device could have historically been active from 12:00 pm until 12:00 am the next day. In such an example, there may be no single window of time during which firmware updates may be scheduled. As such, in particular embodiments, the firmware management component 270 is configured to determine an optimal firmware update time for each of the devices. In doing so, the firmware management component 270 could be configured to consider historical bandwidth usage across the wireless network in selecting the optimal firmware upgrade times for the devices. Continuing the example, if the firmware management component 270 determines that bandwidth usage for the wireless network has historically been low from 6:00 am until 12:00 pm, the firmware management component 270 could schedule updates for the second device between the hours of 6:00 am and 12:00 pm. That is, because the second device has historically been inactive during these hours and because bandwidth usage across the wireless network has been low during these hours, the firmware management component 270 may determine that this period of time is an optimal time for updating the firmware of the second device. Advantageously, doing so ensures that firmware on the second device is updated in a manner that is unlikely to disrupt users of the second device or any other users of the wireless network.

Figure 5:
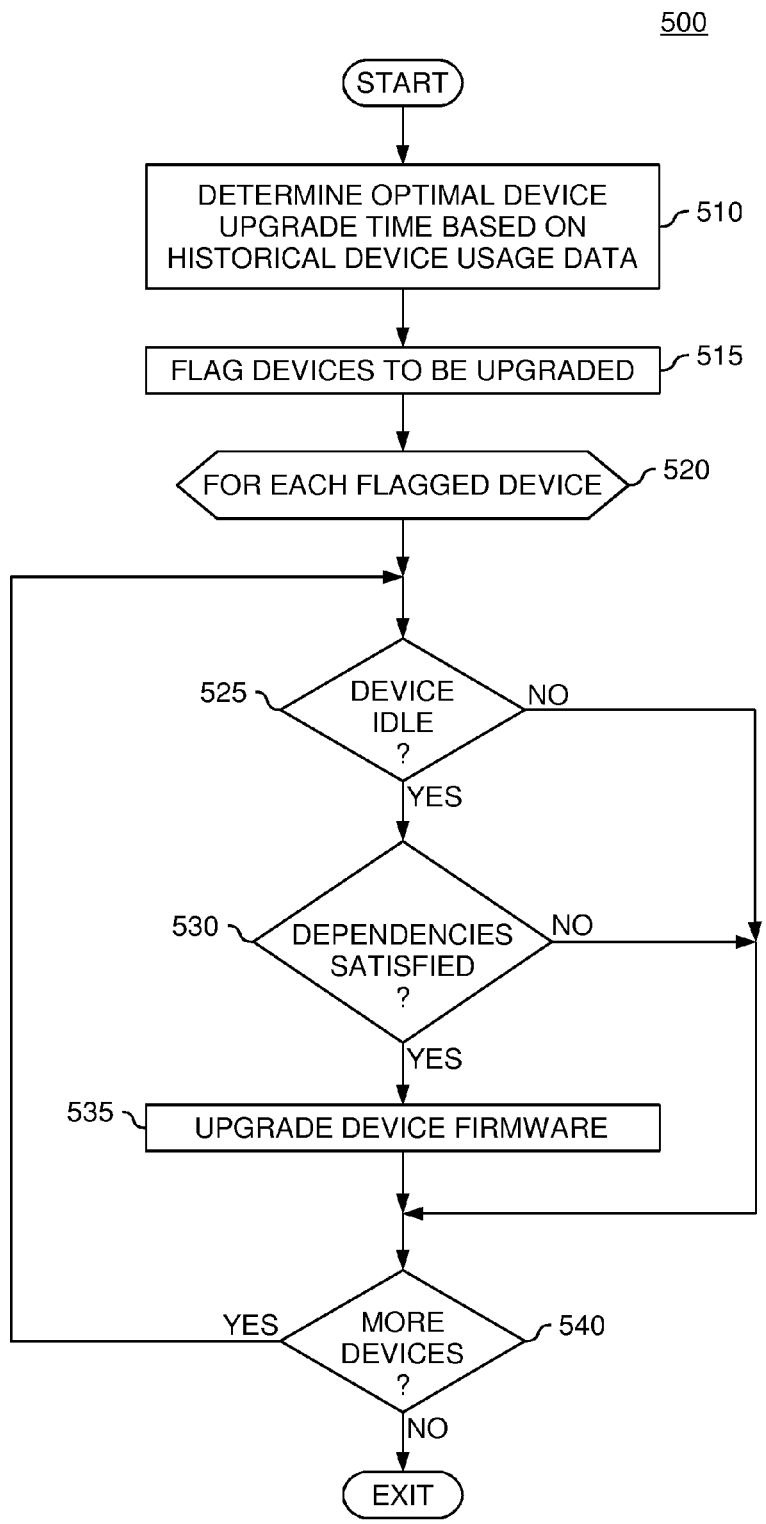
FIG. 5 is a flow diagram illustrating a method for upgrading the firmware of one or more devices, according to one embodiment presented in this disclosure.

FIG. 5 is a flow diagram illustrating a method for upgrading the firmware of one or more devices, according to one embodiment presented in this disclosure. As shown, the method 500 begins at step 510, where the firmware management component 270 determines an optimal upgrade time for upgrading the firmware of one or more devices based on historical device usage data. For instance, the firmware management component 270 could determine the optimal upgrade time using the method 400 shown in FIG. 4 and discussed above. The firmware management component 270 then flags one or more devices to have their firmware updated (step 515). As an example, the firmware management component 270 could flag the devices using the method 300 shown in FIG. 3 and discussed above.

The method 500 then enters a loop at step 520, where during the optimal upgrade time and for each flagged device, the firmware management component 270 determines whether the device is currently idle (step 525). For instance, the firmware management component 270 could determine whether the device is currently idle based on monitored network activity of the device. As an example, if the device is currently using a substantial amount of bandwidth, the firmware management component 270 could determine that the device is not currently idle. The firmware management component 270 could transmit a status request to the device to determine whether the device is currently idle. For example, if in response to such a status request the firmware management component 270 receives a status report from the device indicating that the device is currently in use, the firmware management component 270 could determine that the device is not currently idle. If the firmware management component 270 determines the device is not idle, the firmware management component 270 determines whether there are additional flagged devices to consider (step 540). That is, in the depicted embodiment, the firmware management component 270 avoids updating the firmware of any devices that are currently in use, so as to avoid any disruption for users of the device.

If the firmware management component 270 determines the device is currently idle, the firmware management component 270 determines whether any dependencies for the firmware upgrade of the device are currently satisfied and/or can be satisfied through an additional firmware update. For example, if a first device is dependent upon a second device having a minimum firmware version, the firmware management component 270 could determine whether the second device already has at least the minimum version of the firmware installed. If not, the firmware management component 270 could further determine whether the second device can be updated to at least the minimum version of the firmware. For instance, the firmware management component 270 could determine whether at least the minimum version of firmware is publically available (e.g., by querying a remote server to see if an acceptable version of firmware can be downloaded). Additionally, the firmware management component 270 could check for any dependencies for installing the firmware on the second device and could further determine whether any such dependencies are satisfied and/or can be satisfied for the second device.

If the firmware management component 270 determines that the dependencies are satisfied, the firmware management component 270 proceeds to update the firmware of the device during the determined optimal upgrade time window (step 535). For instance, the firmware management component 270 could be configured to retrieve an updated version of the firmware for the device (e.g., in executable form) and to remotely install the updated version of the firmware onto the device (e.g., by running the executable). In another embodiment, the firmware management component 270 is configured to download the updated version of the firmware and then to access an interface for the device to upload and install the updated firmware on the device. For instance, the firmware management component 270 could download the firmware and could then access a web interface provided by the device to transmit the updated firmware to the device for installation.

In one embodiment, the firmware management component 270 updates the device firmware by transmitting a particular message to the device, instructing the device to proceed with a firmware update. For example, a particular device could maintain information on the network address of a remote server from which updated firmware for the particular device can be downloaded and installed. Continuing the example, the particular device could implement a common API or protocol through which the firmware management component 270 could instruct the device to proceed with a firmware update. For instance, the firmware management component 270 could transmit a network message to the particular device specifying that the device should proceed with a firmware update. The device could then receive the network message and, in response, execute a local routine to download an updated version of the device firmware and proceed with installing the updated firmware. Of course, these examples are provided without limitation and for illustrative purposes only. More generally, any technique for updating the firmware of the device consistent with the functionality described herein may be used.

Once the device firmware is updated, or if the firmware management component 270 determines that the dependencies for the update are not and/or cannot be satisfied, or if the firmware management component 270 determines the device is not currently idle, the firmware management component 270 then determines whether there are more flagged devices to update (step 540). If so, the method returns to step 525, where the firmware management component 270 determines whether the next flagged device is currently idle. If instead the firmware management component 270 determines that there are no more flagged devices to consider, then the method 500 ends. Advantageously, the method 500 helps to ensure that the firmware of devices on the wireless network is kept up to date, and does so in a manner that avoids disrupting users of the wireless network and avoids any problems caused by unsatisfied dependencies.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for managing firmware updates for a plurality of devices within a wireless network, comprising:
   monitoring network usage of the plurality of devices to collect historical device usage data;
   monitoring the plurality of devices within the wireless network to determine historical presence information, wherein the historical presence information specifies when at least one of the plurality of devices connected to and disconnected from the wireless network;
   based on the collected historical device usage data and the determined historical presence information, determining a window of time for updating firmware of the plurality of devices;
   flagging at least one of the plurality of devices for updating, based on, for each of the at least one devices, a current firmware version for the device and a corresponding available firmware version for the device; and
   during the determined window of time, updating the firmware of the at least one flagged device.

2. The method of claim 1, further comprising:
   querying a centralized server to determine the available firmware version for each of the plurality of devices.

3. The method of claim 1, further comprising:
   receiving the available firmware version from each of the plurality of devices, wherein each of the plurality of devices is configured to query a respective remote server to determine the available firmware version for the device.

4. The method of claim 1, wherein flagging at least one of the plurality of devices further comprises:
   determining a dependency exists between a firmware update for a first device in the plurality of devices and a required firmware version for a second device in the plurality of devices;
   determining whether the required firmware version is available to be installed on the second device; and
   upon determining that the required firmware version is available to be installed on the second device, flagging the first device and the second device to be updated.

5. The method of claim 1, wherein flagging at least one of the plurality of devices further comprises:
   determining a dependency exists between a firmware update for a first device in the plurality of devices and a required firmware version for a second device in the plurality of devices;
   determining whether the required firmware version is currently installed on the second device; and
   upon determining that the required firmware version is currently installed on the second device, flagging the first device to be updated.

6. The method of claim 1, further comprising:
   querying a first device of the plurality of devices to determine a status of the first device,
   wherein determining the optimal window of time for updating the firmware of the plurality of devices is further based on the determined status of the first device.

7. The method of claim 1, wherein determining the optimal window of time for updating the firmware of the plurality of devices is further based on historical bandwidth usage of the plurality of devices, as reflected in the historical device usage data.

8. The method of claim 1, further comprising:
   for one or more of the flagged devices, transmitting a request to a remote server for an updated version of firmware for the flagged device; and
   receiving an updated version of the firmware for the flagged device from the remote server,
   wherein updating the firmware of the flagged at least one device uses the received updated version of the firmware for the flagged device.

9. A computer program product for managing firmware updates for a plurality of devices within a wireless network, comprising:
   computer code that monitors network usage of the plurality of devices to collect historical device usage data;
   computer code that monitors the plurality of devices within the wireless network to determine historical presence information, wherein the historical presence information specifies when at least one of the plurality of devices connected to and disconnected from the wireless network
   computer code that, based on the collected historical device usage data and the determined historical presence information, determines a window of time for updating firmware of the plurality of devices;
   computer code that flags at least one of the plurality of devices for updating, based on, for each of the at least one devices, a current firmware version for the device and a corresponding available firmware version for the device;
   computer code that, during the determined window of time, updates the firmware of the at least one flagged device; and
   a computer readable storage medium that stores the computer codes.

10. The computer program product of claim 9, further comprising:
    computer code that queries a centralized server to determine the available firmware version for each of the plurality of devices.

11. The computer program product of claim 9, further comprising:
    computer code that receives the available firmware version from each of the plurality of devices, wherein each of the plurality of devices is configured to query a respective remote server to determine the available firmware version for the device.

12. The computer program product of claim 9, wherein the computer code that flags at least one of the plurality of devices further comprises:
    computer code that determines a dependency exists between a firmware update for a first device in the plurality of devices and a required firmware version for a second device in the plurality of devices;
    computer code that determines whether the required firmware version is available to be installed on the second device; and computer code that, upon determining that the required firmware version is available to be installed on the second device, flags the first device and the second device to be updated.

13. The computer program product of claim 9, wherein the computer code that flags at least one of the plurality of devices further comprises:
   computer code that determines a dependency exists between a firmware update for a first device in the plurality of devices and a required firmware version for a second device in the plurality of devices;
   computer code that determines whether the required firmware version is currently installed on the second device; and
   computer code that, upon determining that the required firmware version is currently installed on the second device, flags the first device to be updated.

14. The computer program product of claim 9, further comprising:
   computer code that queries a first device of the plurality of devices to determine a status of the first device,
   wherein the computer code that determines the optimal window of time for updating the firmware of the plurality of devices is further based on the determined status of the first device.

15. The computer program product of claim 9, wherein the computer code that determines the optimal window of time for updating the firmware of the plurality of devices is further based on historical bandwidth usage of the plurality of devices, as reflected in the historical device usage data.

16. The computer program product of claim 9, further comprising:
   computer code that, for one or more of the flagged devices, transmits a request to a remote server for an updated version of firmware for the flagged device; and
   computer code that receives an updated version of the firmware for the flagged device from the remote server,
   wherein the computer code that updates the firmware of the flagged at least one device uses the received updated version of the firmware for the flagged device.

17. A network device, comprising:
   a processor; and
   a memory to store executable code which, when executed, performs a method for managing firmware updates for a plurality of devices within a wireless network, comprising:
      monitoring network usage of the plurality of devices to collect historical device usage data;
      monitoring the plurality of devices within the wireless network to determine historical presence information, wherein the historical presence information specifies when at least one of the plurality of devices connected to and disconnected from the wireless network;
      based on the collected historical device usage data and the determined historical presence information, determining a window of time for updating firmware of the plurality of devices;
      flagging at least one of the plurality of devices for updating, based on, for each of the at least one devices, a current firmware version for the device and a corresponding available firmware version for the device; and
      during the determined window of time, updating the firmware of the at least one flagged device.

18. The network device of claim 17, the method further comprising:
   querying a centralized server to determine the available firmware version for each of the plurality of devices.

19. The network device of claim 17, the method further comprising:
   receiving the available firmware version from each of the plurality of devices, wherein each of the plurality of devices is configured to query a respective remote server to determine the available firmware version for the device.

20. The network device of claim 17, wherein flagging at least one of the plurality of devices further comprises:
   determining a dependency exists between a firmware update for a first device in the plurality of devices and a required firmware version for a second device in the plurality of devices;
   determining whether the required firmware version is available to be installed on the second device; and
   upon determining that the required firmware version is available to be installed on the second device, flagging the first device and the second device to be updated.

21. The network device of claim 17, wherein flagging at least one of the plurality of devices further comprises:
   determining a dependency exists between a firmware update for a first device in the plurality of devices and a required firmware version for a second device in the plurality of devices;
   determining whether the required firmware version is currently installed on the second device; and
   upon determining that the required firmware version is currently installed on the second device, flagging the first device to be updated.

22. The network device of claim 17, the method further comprising:
   querying a first device of the plurality of devices to determine a status of the first device,
   wherein determining the optimal window of time for updating the firmware of the plurality of devices is further based on the determine status of the first device.

23. The network device of claim 17, wherein determining the optimal window of time for updating the firmware of the plurality of devices is further based on historical bandwidth usage of the plurality of devices, as reflected in the historical device usage data.

24. The network device of claim 17, the method further comprising:
   for one or more of the flagged devices, transmitting a request to a remote server for an updated version of firmware for the flagged device; and
   receiving an updated version of the firmware for the flagged device from the remote server,
   wherein updating the firmware of the flagged at least one device uses the received updated version of the firmware for the flagged device.

* * * * *